United States Patent [19]

Baujat et al.

[11] Patent Number: 5,183,628
[45] Date of Patent: Feb. 2, 1993

[54] NUCLEAR REACTOR INTERNALS WITH CLUSTER GUIDES

[75] Inventors: Jacques Baujat, Versailles; Gérard Chevereau, Le Raincy, both of France

[73] Assignee: Framatome, Courbevoie, France

[21] Appl. No.: 695,907

[22] Filed: May 6, 1991

[30] Foreign Application Priority Data

May 7, 1990 [FR] France ............... 90 05729

[51] Int. Cl.⁵ .................................. G21C 1/04
[52] U.S. Cl. ........................ 376/353; 376/221; 376/223
[58] Field of Search .......... 376/353, 221, 223; 976/DIG. 126, DIG. 127, DIG. 128

[56] References Cited

U.S. PATENT DOCUMENTS

| 4,729,868 | 3/1988 | Gillett et al. ............... 376/285 |
| 4,752,438 | 6/1988 | Desfontaines et al. ....... 376/285 |
| 4,759,903 | 7/1988 | Fajeau et al. ............... 376/336 |
| 4,844,859 | 7/1989 | Coussau ..................... 376/353 |
| 5,006,305 | 4/1991 | Denizou ..................... 376/354 |
| 5,035,448 | 7/1991 | Seabrook et al. ............ 285/94 |
| 5,035,852 | 7/1991 | Land et al. ................. 376/353 |

Primary Examiner—Donald P. Walsh
Assistant Examiner—Meena Chelliah
Attorney, Agent, or Firm—Pollock, Vande Sande & Priddy

[57] ABSTRACT

Internal equipments suitable for use in a nuclear reactor comprise a lower plate provided with openings for the coolant leaving the core, an upper plate, support columns connecting the plates together and guides for the vertically movable control clusters. Each guide has an upper section fixed to the upper plate and a lower section extending between the upper and lower plates. The lower section (32) comprises a base bearing on a frusto-conical seat fast with the lower plate and is subjected to the action of resilient means exerting a force pressing the base on the seat.

8 Claims, 2 Drawing Sheets

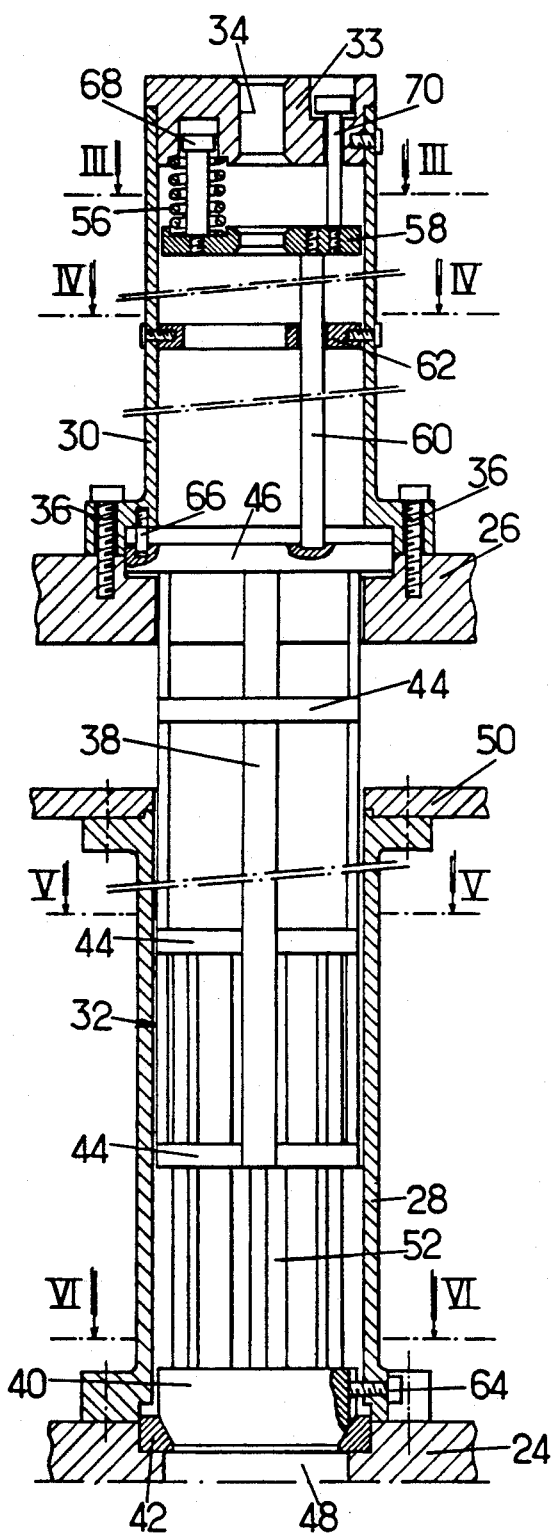
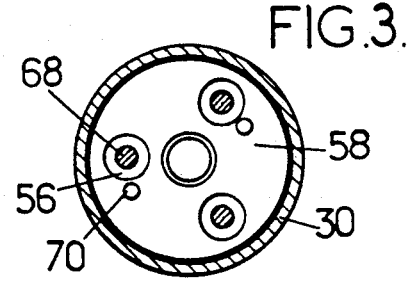
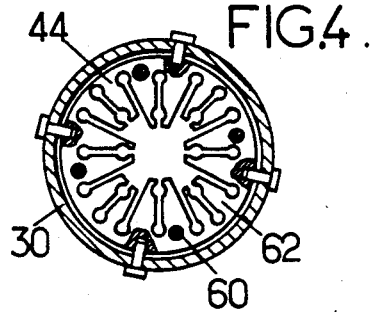
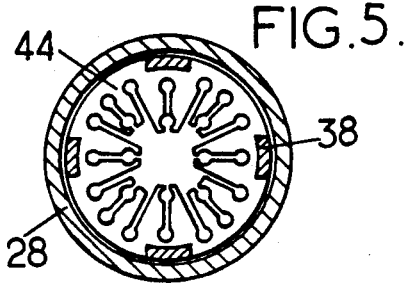
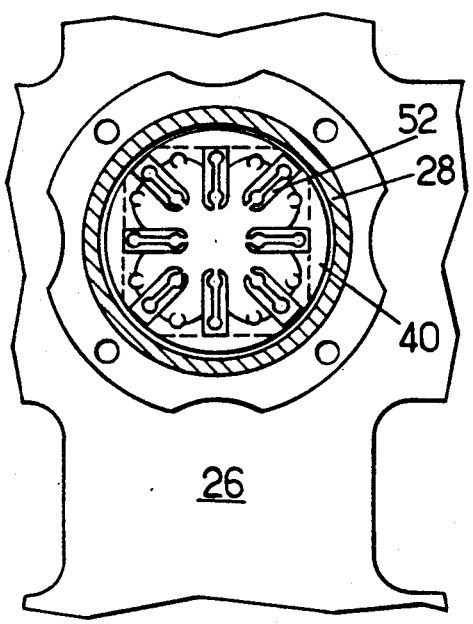

NUCLEAR REACTOR INTERNALS WITH CLUSTER GUIDES

BACKGROUND OF THE INVENTION

The present invention relates to upper internal equipments for nuclear reactors and is particularly suitable for use in water cooled and moderated nuclear reactors.

It relates more particularly to internal equipments located over the core of a nuclear reactor, having a lower plate formed with openings for the coolant leaving the core, an upper plate, support columns connecting the plates together, cluster guides for control cluster vertically movable between a position in which they are inserted in the core and a position in which they are out of the core, each of the guides having an upper section fixed to the upper plate and a lower section extending between the upper and lower plates.

The purpose of the control cluster guides is to guide the rods of the cluster, to avoid deformation thereof and to protect these rods whatever their position during normal operation of the reactor and in case of an incident.

In the upper part, they often comprise a tube along which transverse plates are spaced apart for guiding the rods individually and, in the lower part, split tubes each assigned to a rod.

Cluster guides are also known in which the tube is replaced by vertical longitudinal members.

The guides are individually provided with a device for guiding and centering their lower part on the upper core plate. Different devices for guiding and centering the guide with respect to the lower plate of the internal equipments are known. They are generally designed so that the guides retain the possibility of moving axially, in particular to allow their free expansion in service and to facilitate mounting or removal thereof, while closing the guidance clearances so that the guides do not vibrate under the effect of the turbulence generated by the cooling fluid and limiting the possibilities of lateral deflection of the guides in the case of an earthquake or accidental depressurization of the reactor, due to the breakage of a pipe collecting the cooling fluid leaving the core; this allows the guides to remain in correct alignment with respect to the fuel assemblies and allows the control clusters to move freely.

The guiding devices are often formed of resilient members which have the drawback of fulfilling all the preceding functions simultaneously. Their design then proves difficult, for they must simultaneously be sufficiently flexible to accommodate, on fitting, the misalignments resulting from manufacturing tolerances on the guides and on the lower and upper plates of the upper internals and sufficiently rigid to prevent vibration of the guides, without excessive stresses in the resilient members during fitting.

French Patent No. 2,591,018 describes a cluster guide which, for separating the centering function from the function consisting in limiting the amount of lateral deflection, comprises a guiding and centering device formed by a set of several rigid blades having a radial clearance in an opening of the lower plate and by a set of a plurality of flexible blades having a shape at rest such that they bear resiliently on the edge of the opening in the lower plate. This approach is an advance over the prior art, but it does not completely separate the centering function from the vibration limitation function, since the flexible blade abutment participates in both.

SUMMARY OF THE INVENTION

An object of the present invention is to provide internal equipments comprising guide devices having enhanced decoupling between the different functions. To this end it provides equipments of the above defined type in which the lower section has a base bearing on a frustoconical seat fast with the lower plate and subjected to the action of resilient means exerting a force applying the base on the seat.

In an advantageous embodiment, the upper section is fixed to the upper plate and is situated thereabove, and the resilient means are compressed between the end plate of the upper section and an element, such as a floating plate, which may slide in the upper section and is fast with the lower section. The latter, will generally be held in a predetermined angular position by keying means slidable with respect to the upper plate and/or the lower plate.

The lower section may comprise several vertical longitudinal members, e.g., four in number, mutually connecting the evenly spaced transverse guide plates, in which openings are formed of a shape adapted to the distribution of the rods in the control cluster. The top ends of the longitudinal members may be joined together by a flange connected to the element subjected to the action of the resilient means by thrust rods. The longitudinal members may be extended downwards as far as the base or may stop at the last transverse plate, which is then connected to the base by individual split guide tubes.

The support columns connecting the upper and lower plates together are advantageously placed about the respective lower guide sections. These columns may be formed by tubes devoid of openings, when the lower plate is formed with cooling fluid outlet passages opening between the columns and when the assemblies are arranged so that the cooling fluid which has swept them may reach these passages. In the opposite case, coolant outlet passages are provided at the lower part of the columns, where the rods of the control clusters are individually protected against the action of the cooling fluid by split tubes or similar means.

Whatever the embodiment selected, it separates the function of centering and absorbing the fitting clearances, provided by contact of the base with the seat, from limitation of vibrations, provided by the resilient means.

BRIEF DESCRIPTION OF THE DRAWINGS

The invention will be better understood from the following description of particular embodiments, given by way of example and illustrated in the accompanying drawings, in which:

FIG. 2 is a sectional view figures showing, on an enlarged scale, a guide device according to the invention applicable to the reactor of FIG. 1; and FIGS. 3 to 6 are cross-sectional views through lines III—III, IV—IV, V—V and VI—VI of FIG. 2;

FIGS. 5 and 6, similar to FIG. 4, show modified embodiments.

DETAILED DESCRIPTION OF PREFERRED EMBODIMENTS

Figure 1:
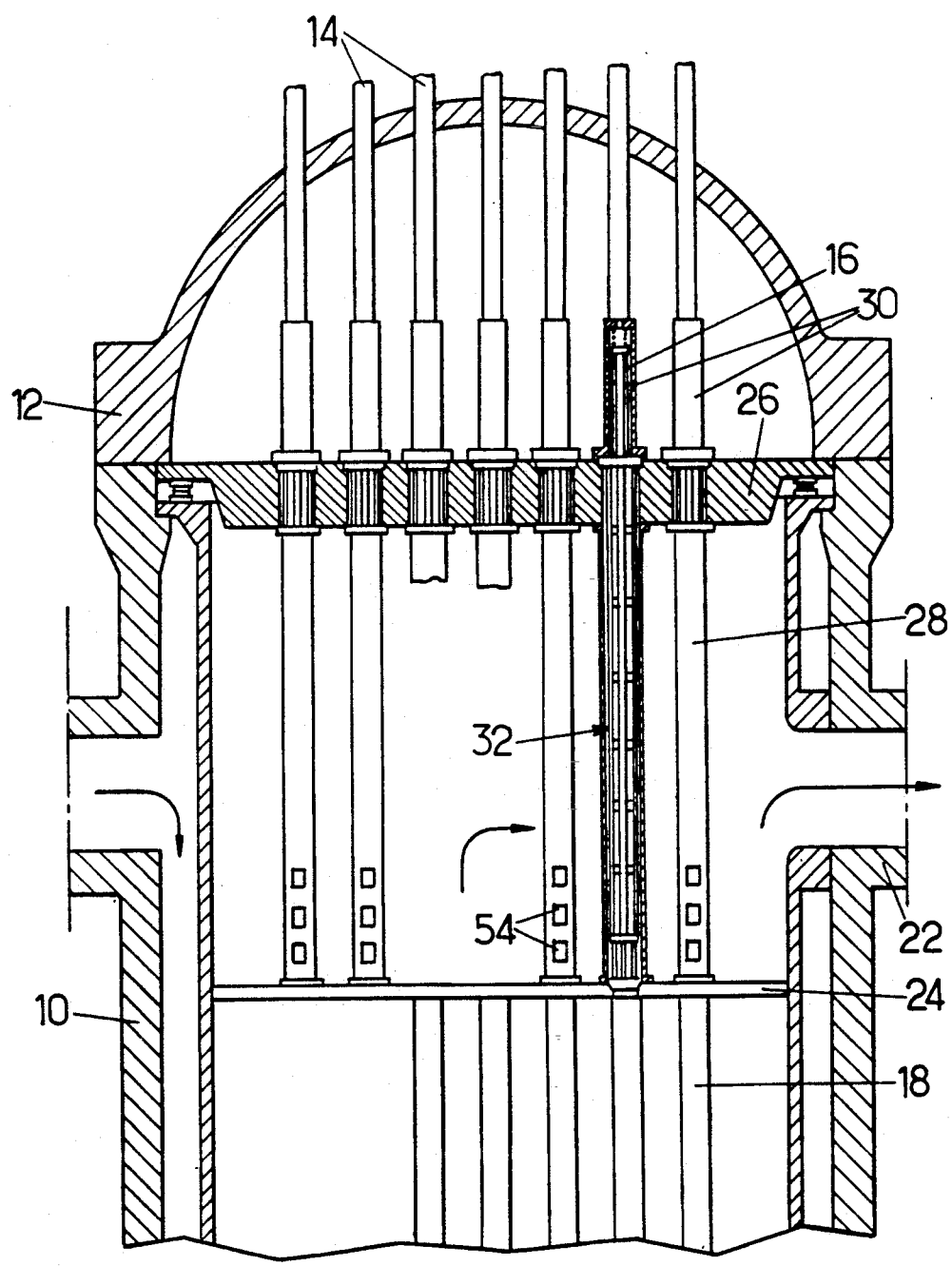
FIG. 1 is a schematic view, in vertical cross-section, of the upper part of a reactor to which the invention may be applied.

The invention will be described, by way of example, in its application to a pressurized water reactor of the kind shown in FIG. 1. The reactor shown in FIG. 1 comprises a vessel 10 withstanding the pressure of the water forming the coolant and moderator. The vessel is closed by a lid 12 which has mechanisms 14 for moving the control clusters 16, only one of which is shown. Vessel 10 contains the core 18 formed by the juxtaposition of fuel assemblies each having a structural skeleton and a bundle of fuel rods spaced apart in a regular, square or triangular, lattice. The skeleton of the assemblies comprises guide tubes (not shown) in which absorbent elements may slide which belong to the control clusters (or possibly to neutron energy spectrum variation clusters).

A unit is located above and is designated as upper internal equipments, generally welded. The unit fulfils several functions. It collects the high temperature water flow leaving the core and deflects it towards the outlet nozzle or nozzles 22 of vessel 10. It retains and ensures relative centering of the fuel assemblies 18. Finally, it guides the control clusters 16 cooperating with at least some of the assemblies, during their vertical movement.

The upper internals shown in FIG. 1 comprise a lower plate 24, which receives the thrust of the assemblies subjected to the pressurized water flow, and an upper plate 26 which transfers the resultant of the forces applied to the whole of the internal equipments to vessel 10 and lid 12. Plates 24 and 26 are connected together by tubular spacer columns 28.

Finally, cluster guides are provided in vertical alignment with each mechanism 14. Each cluster guide may be considered as comprising an upper section 30 and a lower section 32. Each of the upper sections is fixed rigidly to the upper plate 26. It is formed of a tubular body ending downwardly as a flange which is applied against the upper face of plate 26, and it is closed at its upper part by an end plate 33 formed with a central hole 34 for passage of the cluster control rod. The flange is fixed on the upper plate 26 by removable means, e.g. screws 36.

The lower section 32 is formed, in the embodiment shown, by a structure ending downwards as a base 40 to be applied against a seat 42 fast with the lower plate 24. The structure also comprises vertical longitudinal members 38 mutually connecting:

a plurality of evenly spaced transverse plates 44, having a cut-out corresponding to the distribution of the absorbent rods in the control cluster (FIGS. 4 and 5), a top flange 46, whose downward movement is limited by a shoulder formed on the lower plate 26, the length of the structure being such that a clearance exists between the flange and the shoulder when base 40 bears on seat 42.

In the illustrated embodiment, the lowest transverse plate 44 and base 40 are joined together by split tubes 52 for continuous guidance of the rods of the cluster, protecting the rods against the coolant flow and replacing the longitudinal members.

Seat 42 will generally be formed as a part fixed to the lower plate 24 and bearing against a shoulder formed about an opening 48 formed in plate 24, in alignment with a fuel assembly of the core.

In the embodiment of the invention shown in FIG. 2, the upper plate 26 is formed by a box having a plate, properly speaking and a dividing wall 50 secured to plate 26 (by means not shown) and defining a space occupied by the coolant. Each of the support columns 28 is disposed about a lower section 32 and has end flanges, one of which is fixed to dividing wall 50 and the other to the lower plate 24, for example by screws. If the reactor is arranged so that the flow from the assemblies passes through passages 48 and bases 40, wide openings 54 (FIG. 1) are formed at the lower part of the columns. If, on the other hand, the outlet passages for the cooling fluid from the core are provided in the lower plate 24 between columns 28, these openings are no longer necessary.

As shown, each cluster guide according to the invention comprises resilient means for applying base 40 against a bearing surface formed on seat 42. As illustrated, the bearing surface formed on the seat has a frusto-conical shape and the bearing surface of the base also has a frusto-conical shape, which guarantees good centering of the base, and thus of the lower part of the cluster guide, on seat 42. The same result could be attained with a frusto-conical bearing surface of the seat and a bearing surface of the base in the form of a spherical cap.

The resilient means shown in FIGS. 2 to 4 comprise springs 56, three in number, each compressed between the end plate 33 of the upper section, 30 and a floating plate 58 vertically slidable in the body of the upper section. The floating plate 58 is secured to flange 46 by thrust rods 60 guided by plates 62 fixed to the body of the upper section and reducing the risk of buckling.

The movable assembly formed by the lower section 32, rods 60 and plate 58 is guided and angularly indexed by means which comprise, as shown:

a slidable key connection of base 40 on column 28, formed for example by a pin 64 which engages in a vertical groove of base 40;

studs 66 fixed to flange 46 and slidable in blind holes formed in the upper section 30.

Springs 56 will generally be guided by screws 68 which pass through them and whose heads are slidably received in end plate 33. Finally, retaining rods 70 may be fixed to the floating plate 58 so as to retain the lower section 32 during assembling of the guide in the internals.

Springs 56 may have a small vertical size, because they may be very stiff and because the amounts of length of the springs when they apply the bases 40 on the respective seats 42 do not exceed a few millimeters. In practice, these springs and their compression force will be selected so that the force of the base bearing on the seat is about 1200 N. In addition, they are situated in a zone where the radiation dose is relatively small; this guarantees a long life. The bearing surface of the seat will frequently have conicity between 25° and 45°.

We claim:

1. In a nuclear reactor having a core, internals mounted over said core, comprising: a lower plate provided with openings for coolant leaving the core; an upper plate; a plurality of support columns mutually connecting the plates; and a plurality of guides for vertically movable control clusters each of which comprises a plurality of parallel control rods, wherein each of said guides has an upper section securely fixed to the upper plate and a lower section extending between the upper and lower plates, wherein the lower section of each said guide has a base bearing on a respective frusto-conical bearing surface of a seat which is fast with said lower plate and wherein said lower section is subjected to the downward force of resilient means biasing said base onto said seat.

2. Internals according to claim 1, wherein said upper section is fixed to the upper plate and projects above said upper plate and wherein the resilient means comprise spring means compressed between an end wall of said upper section and an element fast with the lower section.

3. Internals according to claim 2, wherein said element fast with the lower section is a floating plate connected to said lower section by thrust rods passing through guide means located in the upper section.

4. Internals according to claim 1, wherein said lower section comprises a plurality of vertical longitudinal members connecting together an upper flange subjected to the downward force of said resilient means, transverse plates distributed along said guide and having a shape conformed to that of the control rods for guiding the control rods of the respective cluster, and said base.

5. Internals according to claim 4, further comprising a plurality of mutually parallel split tubes for guiding the rods in a lower part of the lower section, said split tubes rigidly connecting at least a lowest one of said transverse plates to said base.

6. Internals according to claim 1, further comprising indexing means for holding the base in a given angular position with respect to the lower plate.

7. Internals according to claim 6, wherein said indexing means are formed by a slidable keying connection between said base and said lower plate.

8. Internals according to claim 1, wherein said support columns are disposed about respective ones of said lower sections.

* * * * *